United States Patent [19]
Ernst et al.

[11] Patent Number: 5,754,815
[45] Date of Patent: May 19, 1998

[54] METHOD FOR CONTROLLING A SEQUENCE OF ACCESSES OF A PROCESSOR TO AN ALLOCATED MEMORY

[75] Inventors: Edmund Ernst; Wolfgang Kosler, both of Munich, Germany

[73] Assignee: Siemens Aktiengesellschaft, Munich, Germany

[21] Appl. No.: 508,968

[22] Filed: Jul. 28, 1995

[30] Foreign Application Priority Data

Jul. 29, 1994 [DE] Germany ................ 44 270 042.9

[51] Int. Cl.$^6$ .................................. G06F 12/02
[52] U.S. Cl. ............... 395/405; 395/431; 395/454; 395/481; 395/494; 365/189.01; 365/189.05; 365/230.04; 365/230.01
[58] Field of Search ..................... 395/484, 454, 395/405, 431, 481, 494; 365/189.01, 189.05, 230.01, 230.04

[56] References Cited

U.S. PATENT DOCUMENTS 5,247,644  9/1993  Johnson et al. ............ 395/425
5,537,577  7/1996  Sugimura et al. ........... 395/484

OTHER PUBLICATIONS

PC–Hardwarebuch, Hans–Peter Messmer, Addison–Wesley Publishing Company, (1992) pp. 290–298.
Microprocessor and Peripheral Handbook, vol. 1, Microprocessor, Intel the Microcomputer Company, (1988), pp. 4–1, 4–68 and 4–69.

Primary Examiner—Tod R. Swann
Assistant Examiner—Hong C. Kim
Attorney, Agent, or Firm—Hill, Steadman & Simpson

[57] ABSTRACT

The method controls the sequence (Q) of accesses (Z) of a processor (MP) to an allocated memory (SP) that is formed by at least two individually addressable, static sub-memories or, respectively, memory banks (SRAM 0, 1). Using a drive logic (ASL) inserted between the processor (MP) and, for example, two sub-memories (SRAM 0, 1), a first memory address (sa1) is switched in conformity with an access cycle to the addressed sub-memory (SRAM 0, 1) in a first access (Z) of a sequence (Q), a memory link address (sfa1) for the further sub-memories (SRAM 0, 1) is formed, is switched thereto and a reading or writing of a data (d) is initiated based on the criterion of the status information (sti). Subsequently, the sub-memories (SRAM 0, 1) are cyclically successively driven, a respective data (d) is read or stored using an intermediate memory (ZSP) and a memory link address (sfa2, 3) is respectively formed such that the two sub-memories (SRAM 0, 1) are successively and cyclically driven. As a result of the method, an especially advantageous memory design for communication systems (KS), particularly for telecommunication private branch exchanges, is realized with static sub-memories (SRAM 0, 1), whereby the memory accesses (Z) of a sequence (Q) of accesses (Z) occur at maximum processor access speed.

17 Claims, 3 Drawing Sheets

METHOD FOR CONTROLLING A SEQUENCE OF ACCESSES OF A PROCESSOR TO AN ALLOCATED MEMORY

BACKGROUND OF THE INVENTION

The processing power of microprocessor systems, particularly in communication system, is dependent, first, on the internal processing speed of the processor and, second, on the access speed to a connected memory, particularly a main memory. Since current microprocessor systems, for example Intel 486 DX systems, have extremely high internal processing speeds, the processing power of the microprocessors is essentially limited by the access times to the connected main memory. Up to now, dynamic RAM memory modules (DRAM) which are preceded by a relatively small cache memory are utilized for the design of main memories for microprocessors, particularly in communication systems, that is, telecommunication systems. Dependent on the strategy, the main memory addresses and/or data that are used most frequency or most recently are stored in a cache memory. Such main memory designs are advantageous for personal computer applications and achieve an acceptable processing power. However, a main memory design having the properties set forth below cannot be achieved for communication systems.

A main memory for a communication system should comprise the following properties:

- the main memory for time-critical, switching-oriented programs and data lies in the range from a few M bytes up to 50 M bytes;
- the switching-oriented programs or, respectively, subprograms are executed with approximately the same probability;
- the program has frequent interruptions, that is, longer sequential program parts occur in a diminished scope;
- the plurality of data access cycles is extremely high in relationship to program access cycles;
- accesses to data are usually statistically independent and occur to all areas of the main memory with the same probability; and
- a sequence of accesses mainly comprises few continuous access cycles, for example 3-8.

In microprocessor systems with the known cache memories, waiting cycles are required in the overwhelming plurality of access cycles to the main memory. These waiting cycles are formed within the framework of an access cycle in the microprocessor system so that the access time predetermined by the main memory is not downwardly transgressed. This means a substantial reduction in the processing power of, in particular, modern microprocessor systems whose internal processing speeds increase with new systems.

SUMMARY OF THE INVENTION

It is an object of the present invention to provide a method for controlling a sequence of accesses of a processor to an allocated main memory, taking an especially advantageous memory design for communication systems into consideration, such that the processing power is increased, particularly given accesses to the main memory.

In general terms the present invention is a method for controlling a predetermined sequence of accesses of a microprocessor via a processor bus to an allocated memory having a plurality of sub-memories formed by individual addressable sub-memories. Data being transferred from or to the micro-processor via a data intermediate memory, which is controlled by an access cycle, the access cycle, which is controlled via the processor bus onto the memory, having m processor clocks, and a read or write cycle sequencing in the memory having n processor clocks, where n is greater than m. The method has the following steps:

initiating a sequence of accesses by at least one first memory address formed by the processor and by status information indicating the reading or writing of data from or to the memory using drive logic inserted between the micro-processor and the sub-memories;

switching a first memory address, after the occurrence of the first memory address to the addressed sub-memory and forming a respective memory link address for a further sub-memory according to a criterion of the predetermined sequence and respectively switching the first memory address to the further sub-memory, as a result whereof a read or write cycle is initiated in all sub-memories based on a criterion of the status information; and proceeding from the sub-memory addressed by the first memory address, cyclically and successively driving the sub-memories according to the criterion of the sequence in conformity with the access cycle, whereby, in a drive, based on the criterion of the status information, read data present at a driven sub-memory is transferred into the intermediate memory and is switched to the micro-processor in conformity with a processor cycle or data communicated from the microprocessor is stored in the intermediate memory controlled by the processor clock and is also conducted to the addressed sub-memory, and insofar as provided according to the criterion of sequence of accesses, the current memory address is modified, is conducted to the driven sub-memory and, based on the criterion of the status information, an access onto the respective sub-memory is initiated.

The method of the present invention is based on a division of the memory, which the microprocessor should access with the shortest access times, into at least two sub-memories realized by static memory banks. In a predetermined sequence of accesses (for example, four accesses), the first memory address in the first access to one of the sub-memories is applied to the addressed sub-memory and the memory link or sequential addresses are immediately formed for the further sub-memories proceeding from the first sub-memory address and are applied to the sub-memories (to the other sub-memory given two sub-memories). In the first and in further accesses, data that is present at the addressed sub-memory is read or, respectively, stored and a memory link or sequential address is respectively formed such based on the criterion of the predetermined sequence of accesses. It is formed such that the sub-memories are successively cyclically addressed, that is, in alternation given two sub-memories, before the actual access of the processor and respective data is read from the respective sub-memory or stored in the memory or, respectively, written into the memory based on the criterion of the status information. The data that is read or is to be stored is transferred from the memory to the processor or, respectively, from the processor to the memory in conformity with the processor clock and processor cycle using an intermediate or buffer memory.

In an advantageous development of the present invention, the plurality of sub-memories is determined dependent on the differential amount (n–m) between the plurality n of processor clocks of a read or write cycle sequencing in the memory and the plurality m of processor clocks of an access cycle to the memory controlled via the processor bus. In a plurality of applications, a division of the memory into two sub-memories suffices in order to achieve the maximum access speed to the sub-memories controlled by the processor. In a sequence having four accesses, the sub-memories are thereby addressed in alternation using the address bits having the significance $2^2$ and $2^3$ before the access of the processor, that is, in the respectively preceding access given two sub-memories. Proceeding from the first memory address, the address bits having the significance $2^2$ and $2^3$ are utilized for the formation of the memory link or sequential address. The formation of the memory link or sequential address using the address bits having the significance $2^2$ and $2^3$ allows an economical realization of the drive logic. Also, the memory link or sequential addresses are to be formed in the drive logic in conformity with the processor clock and must be applied to the memory in conformity with the memory access cycle. Current microprocessors implement an access cycle to the memory in a minimum of one or two processor clocks, whereby the plurality of processor clocks in the first access cycle of a sequence is matched in the control logic to the memory access time and processor-conforming access cycles are provided for the further accesses of a sequence. Processor-clocked intermediate memories or buffer memories and logic circuits are provided in the drive logic for a control of the accesses onto the memory in conformity with the processor clock and access cycle.

Given an access of the processor to the memory with a memory link or sequential address, this is checked for coincidence with the memory link or sequential address of a sequence formed in the drive logic. Given coincidence, the sequence of accesses is contained and, given non-coincidence, the sequence of accesses is ended. The sequence of accesses is ended in the drive logic in that no further sub-memory is addressed and, consequently, data is no longer transferred to the intermediate or buffer memory. The processor determines this ending due to the lack of data in the following access cycles that have been provided and initializes corresponding error message or error elimination measures. A repetition of a sequence of accesses can also be provided.

A sub-memory is especially advantageously realized by a static write-read memory. Static write-read memories comprise shorter access times compared to dynamic write/read memories, as a result whereof processor-suited, short memory access cycles can be achieved given a subdivision of the memory into few sub-memories or, respectively, memory banks.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

DESCRIPTION OF THE PREFERRED EMBODIMENT

Figure 1:
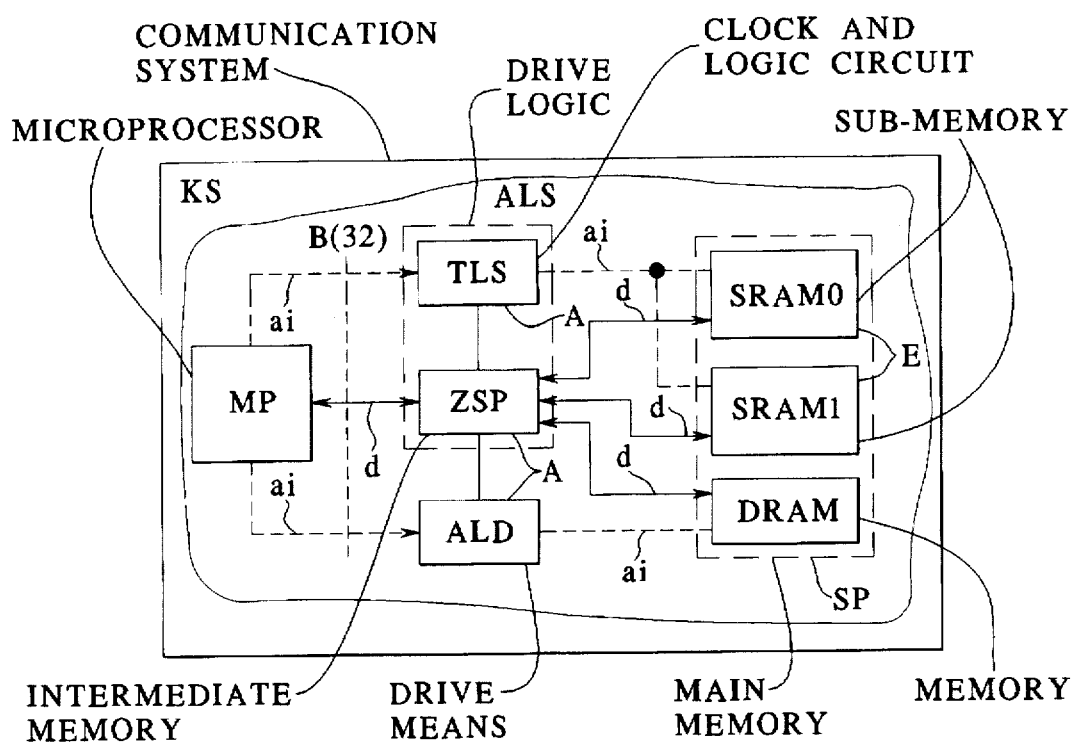
FIG. 1 depicts the processor and memory design in a communication system.

On the basis of a block circuit diagram, FIG. 1 shows a processor and memory design of a communication system KS, particularly a telecommunication switching system, in which the inventive method is realized. A microprocessor or, respectively, a microprocessor system MP is connected via a processor bus B formed by address, data and status lines to a drive logic ALS, whereby that part of the processor bus B communicating the data d is indicated by lines and that part of the processor bus B communicating the address information ai is indicated by broken lines. The processor bus B, for example, has a bus width of 32 bits and a processor clock rate of 33 MHz. A microprocessor system MP having such bus properties is represented, for example, by the microprocessor system 486 DX of Intel. The outputs A of the drive logic ALS representing the processor bus B are connected to two static sub-memories SRAM 0, 1 wherein, for example, the switching-oriented program of a telecommunication switching system is stored. Further, a drive means ALD for dynamic memories DRAM is connected to the processor bus B. The writing and reading of data onto or, respectively, from a dynamic memory DRAM is controlled this commercially available drive means ALD. The static sub-memories SRAM 0, 1 and the dynamic memory DRAM together form the main memory SP of the microprocessor system MP, whereby those programs d or, respectively, data d that are provided for extremely short access times are stored in the static sub-memories SRAM 0, 1. In telecommunication switching systems, it is particularly data d having longer access times that are stored in the dynamic memory DRAM. Given an access to the dynamic memory DRAM, wait states are formed in the microprocessor MP by means of which the access is delayed, since an access within the shortest access time as a result of the microprocessor MP is not possible given the dynamic memories DRAM. Since the inventive method refers to the static sub-memories SRAM 0, 1, access to the dynamic memory DRAM shall not be set forth in greater detail below.

The two static sub-memories SRAM 0, 1 are formed by two static memory banks SRAM 0, 1, whereby each of the static sub-memories SRAM 0, 1 is separately driven via inputs E realized in conformity with the processor bus. The commands d or, respectively, data d to be read into or out of the memories SRAM 0, 1, DRAM are intermediately stored via an intermediate memory ZSP contained in the drive logic that is connected both to the static sub-memories SRAM 0, 1 as well as to the dynamic memory DRAM. The intermediate or buffer memory ZSP is advantageously realized by a four-way bus exchange buffer that, processor-controlled, effects the intermediate storage both to the two static sub-memories SRAM 0, 1 and to the dynamic memory DRAM. This intermediate storage is particularly required for the transfer of the commands d or, respectively, of the data d to the memories DRAM, SRAM 0, 1 in conformity with the processor clock.

Figure 2:
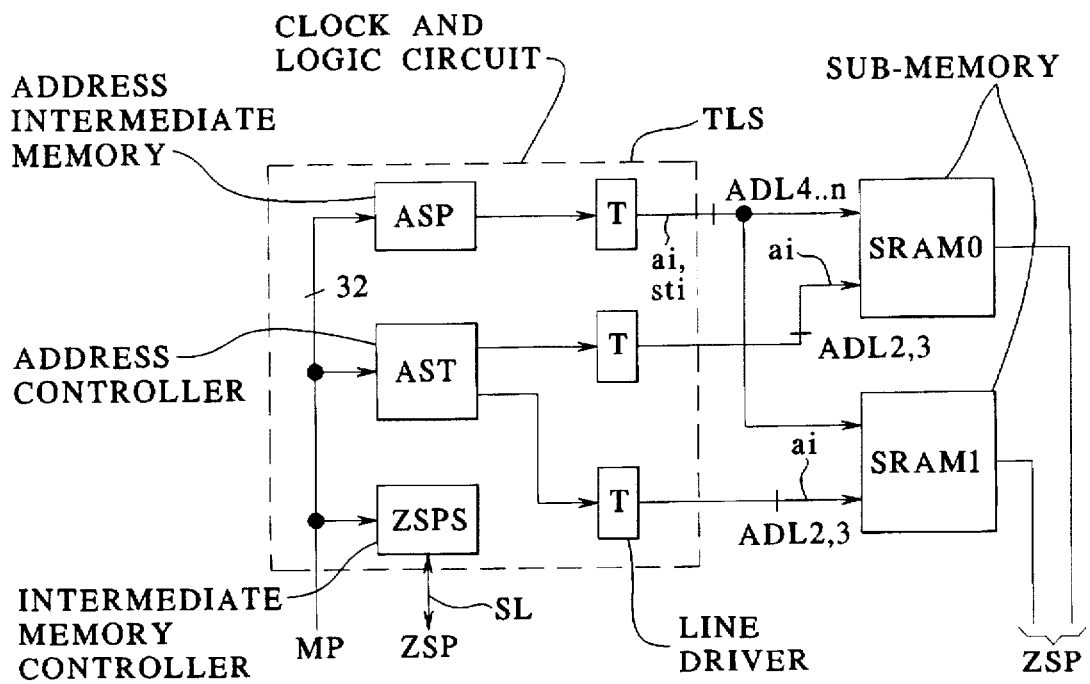
FIG. 2 depicts the structure of the drive logic.

Further, the drive logic ALS shown in detail in FIG. 2 contains a clock and logic circuit TLS. In the clock and logic circuit TLS, the processor bus B is conducted to an address intermediate memory ASP, to an address controller AST and to an intermediate memory controller ZSPS. The address information ai4 (the address lines ADL 4 ... n, 4-31 in the exemplary embodiment) that are communicated from the microprocessor MP and are represented by binary information are intermediately stored in the address intermediate memory ASP and, together with the address information ai2, 3 of the second and third address line ADL 2, 3 formed in the address controller AST, these are applied to the two static sub-memories SRAM 0, 1 conforming to memory access or, respectively, processor clock. Address information ai2, 3 are thereby formed in the address controller AST for every sub-memory or, respectively, every memory bank SRAM 0, 1 and are separately conducted to the two sub-memories SRAM 0, 1 via the address lines ADL 2, 3. Together, the address information ai of the address lines ADL 2–n form the memory address with which the sub-memories SRAM 0, 1 and a memory location in the respective sub-memory SRAM 0, 1 is addressed for the purpose of reading or writing data. For a signal regeneration and the transmission via the address lines ADL 0 ... 31 arranged following the clock and logic circuit TLS, a line driver circuit T is respectively introduced into these.

Further, an intermediate buffer memory controller ZSPS is provided in the clock and logic circuit TLS, the data or, respectively, commands being written into the static sub-memories SRAM 0, 1 or, respectively, being read from the static sub-memories SRAM 0, 1 in conformity with the processor clock via this intermediate memory controller ZSPS. To this end, the intermediate memory controller ZSPS is connected to the intermediate memory ZSP via a control line SL. The function of the clock and logic circuit TLS shall be set forth in greater detail below with reference to the flowchart shown in FIG. 3.

Figure 3A:
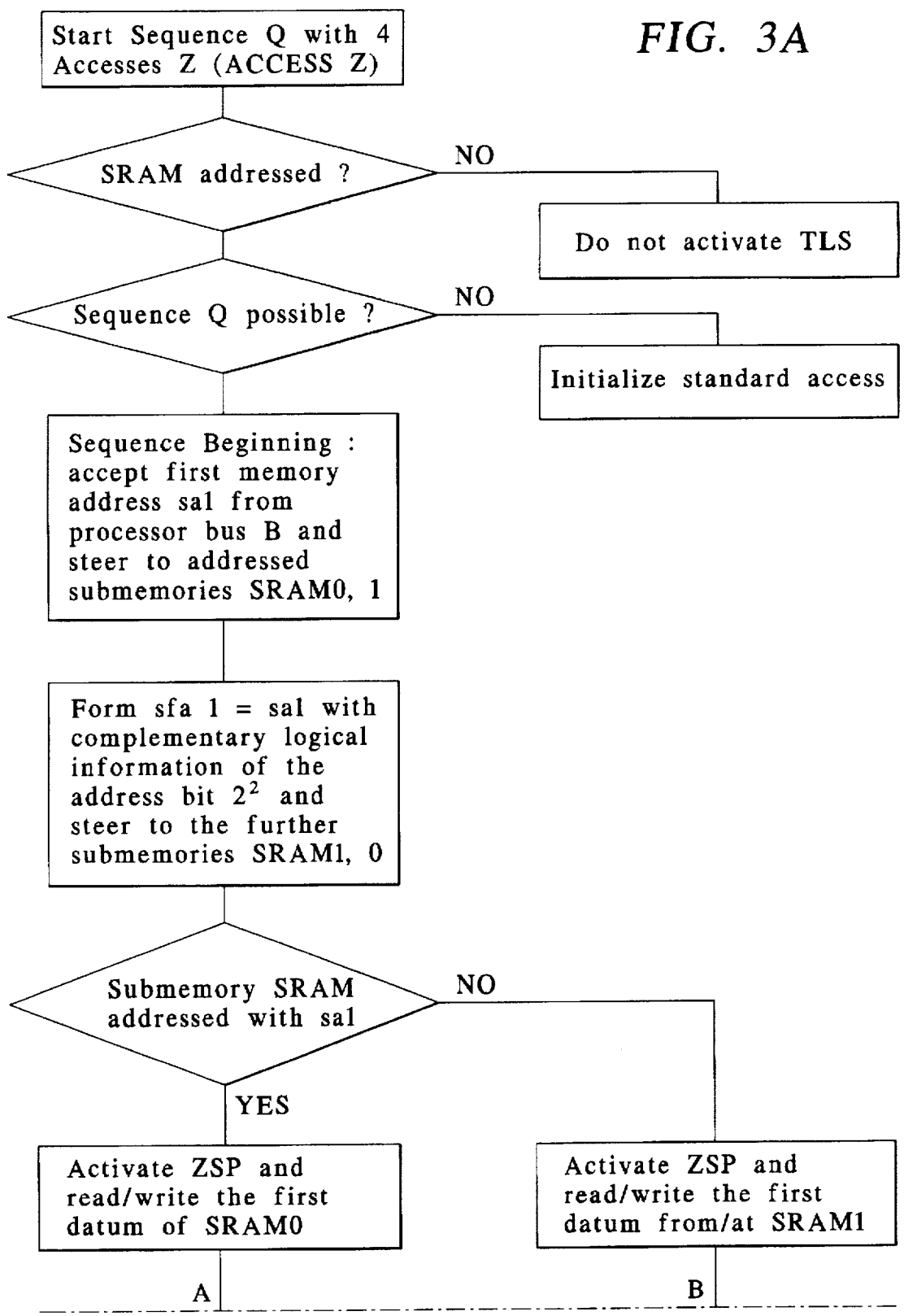
FIG. 3 depicts the function of the drive logic shown is a flowchart.
Figure 3B:
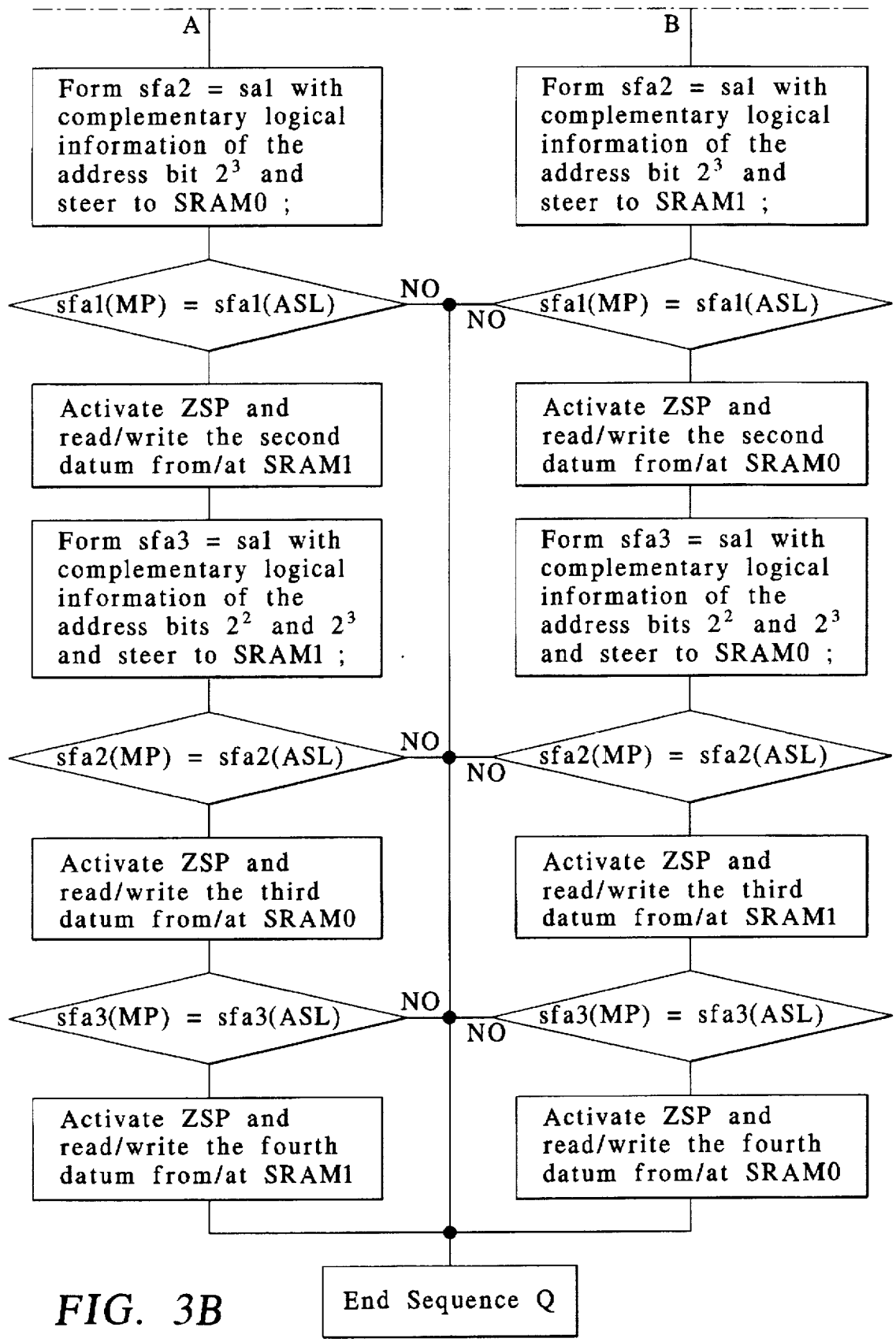

A sequence Q of four memory accesses or, respectively, access Z forms the basis for the flowchart shown in FIG. 3. With a status information STI communicated from the microprocessor MP via the processor bus B, the sub-memories SRAM 0, 1 and the intermediate memory ZSP are informed whether data d or commands d are to be written into the sub-memories SRAM 0, 1 in the four memory accesses Z of a sequence Q, that are to be stored, or whether data d or commands d are to be read out from the sub-memories SRAM 0, 1 (not shown in FIG. 3). Proceeding on the basis of the address information ai of the first memory address sa1 of the first access Z, the three memory link addresses SFA1 ... 3 are formed for the four memory accesses Z according to an algorithm provided both to the microprocessor MP as well as to the clock and logic circuit TLS. Proceeding from the logical information of the address bit having the significance $2^2$ of the first memory address sa1 in the exemplary embodiment, the first memory link address sfa1 is formed at the complementary logical information of the address having the significance $2^2$. The second memory link address sfa2 is formed with the address bit having the significance $2^2$ of the first memory address sa1 and with the complementary logical information of the address bit having the significance $2^3$. In the third memory link address sfa3, the complementary logical information of the address bits having the significance $2^2$ and the significance $2^3$ of the first memory address is respectively employed.

A check is carried out at the beginning of a sequence Q to see whether a static sub-memory SRAM 0, 1 is addressed and whether a sequence Q is possible. After these checks, a sequence Q of four memory accesses or, respectively, access Z is started and, proceeding from the first memory address sa1, the memory link addresses sfa1 ... 3 according to FIG. 3 are formed, whereby, after recognition of the first memory address sa1 in the drive logic ALS, the first memory address sa1 is switched or, respectively, applied to the addressed sub-memory SRAM 0, 1 and the first memory link address sfa1 is formed approximately simultaneously and is switched or, respectively, applied to the further sub-memories SRAM 0, 1 that are not addressed by the first memory address sfa1. It is thereby to be pointed out that the sub-address of the first memory address sa1 that addresses a memory location within a sub-memory SRAM 0, 1 remains unaltered. After the application of the first memory address sa1 or, respectively, of first memory link address sfa1 to the two sub-memories SRAM 0, 1, the reading or writing of a data d in both sub-memories SRAM 0, 1 is initiated based on the criterion of the status information (for example, read data d from the memory SP). The first access onto the memory SP or, respectively, onto a sub-memory SRAM 0, 1 ensues with memory access speed, that is, the processor MP must delay the access cycle, for example by inserting wait state cycles, that is, must lengthen the access cycle time. During the first memory address, the datum d read by way of example is transferred into the intermediate memory ZSP and is transferred to the processor MP and the second memory link address sfa2 is subsequently formed and is switched or, respectively, applied via the address lines ADL 2. . n to the sub-memories SRAM 0, 1 addressed by the first memory address sa1 and, based on the criterion of the status information sti, a reading or writing of a data d is initiated. Following thereupon, the sub-memory SRAM 0, 1 addressed by the first memory link address sfa1 is driven by the drive logic ASL (using the first memory link address sfa1) and the data d that is read by way of example is transferred into the intermediate memory ZSP in conformity with processor clock and processor cycle and is transferred to the processor MP and the third memory link address sfa3 is formed that is switched or, respectively, applied to the respective sub-memory SRAM 0, 1 and, based on the criterion of the status information sti, the reading or writing of a data d is initiated.

Subsequently, the data d read by way of example in the sub-memory SRAM 0, 1 addressed by the second and third memory link addresses sfa 2, 3 is successively transferred to the processor MP via the intermediate memory ZSP in conformity with processor clock and access cycle. The two identical sub-sequences shown in FIG. 3 derive dependent on the sub-memory (SRAM 0 1) addressed in the first memory address sa1.

Due to the successive cyclical distribution of the memory accesses Z onto the two sub-memories SRAM O, 1 (even given more than two sub-memories SRAM 0, 1), memory access speeds suited to the processor can be achieved after the first access Z under the memory SP, that is, the accesses can be implemented with the speed possible in the microprocessor MP (for example, within one processor clock) even though the memory access time of the static sub-memories SRAM 0, 1 lies significantly above the usual memory access time of the microprocessor MP. Before every access Z of the processor onto the memory SP or, respectively, onto a sub-memory SRAM 0, 1 following the first access Z, the memory link address sfa1 ... 3 formed in the clock and logic circuit TLS is compared to the memory link address sfa1 ... 3 formed in the microprocessor MP and, given coincidence, the sequence Q of accesses Z is continued. Given a lack of coincidence, the sequence Q is ended.

The inventive method according to FIG. 3 can be realized both in program-oriented terms as well as in circuit-oriented terms, whereby a circuit-oriented realization is to be preferred given the microprocessor MP currently available with high processing speeds. It should thereby be noted that the formation of the memory link addresses sfa1 ... 3 and the alternating drive of the sub-memories SRAM 0, 1 is implemented in conformity with the microprocessor clock. An arrangement for the implementation of the inventive method is consequently to be provided with a clock component to be matched to the processor speed and to the plurality of processor clocks per access. In particular, these are transfer registers or logic elements controlled by the processor clock. A detailed specification of a circuit-oriented embodiment seems superfluous since a plurality of embodiments are possible with commercially obtainable, user-programmable or customer-tailored circuits dependent on the realization provided.

The invention is not limited to the particular details of the method and apparatus depicted and other modifications and applications are contemplated. Certain other changes may be made in the above described method and apparatus without departing from the true spirit and scope of the invention herein involved. It is intended, therefore, that the subject matter in the above depiction shall be interpreted as illustrative and not in a limiting sense.

What is claimed is:

1. A method for controlling a predetermined sequence of accesses of a microprocessor via a processor bus to an allocated memory having a plurality of sub-memories formed by individual addressable sub-memories, data being transferred from or to the microprocessor via a data intermediate memory, which is controlled by an access cycle, the access cycle, which is transmitted via the processor bus to the memory, having m processor clocks, and a read or write cycle sequencing in the memory having n processor clocks, where n is greater than m, comprising the steps of:

initiating a sequence of accesses by at least one memory address formed by the processor and by status information indicating the reading or writing of data from or to the memory using drive logic inserted between the microprocessor and the sub-memories;

the sequence of accesses being initiated by occurrence of a first memory address of an access of a predetermined sequence of accesses, forwarding of said first memory address to an addressed sub-memory and forming memory link addresses for other sub-memories, respectively, according to a criterion of the predetermined sequence and switching a respective memory link address to a relevant sub-memory, as a result whereof a read or write cycle is initiated in all sub-memories according to a criterion of the respective status information; and proceeding from the sub-memory addressed by the first memory address, cyclically and successively driving the sub-memories according to the criterion of the sequence in conformity with the access cycle, whereby, in a drive logic, based o the criterion of the status information, read data present at a driven sub-memory is transferred into the intermediate memory and is switched to the microprocessor in conformity with a processor cycle or data communicated from the microprocessor is stored in the intermediate memory controlled by the processor clock and is also conducted to the addressed sub-memory, and insofar as provided according to the criterion of sequence of accesses, the current memory address is modified, is conducted to the driven sub-memory and, based on the criterion of the status information, an access onto the respective sub-memory is initiated.

2. The method according to claim 1, wherein the plurality of sub-memories is determined as a function of a differential amount (n−m) between the n processor clocks of a read or write cycle sequencing in the memory and the m processor clocks of an access cycle onto the memory controlled via the processor bus.

3. The method according to claim 1, wherein the first memory address is determined by a memory address that addresses one of the sub-memories.

4. The method according to claim 1, wherein the method further comprises, after the first memory address having a plurality of binary address bits having the significance $2^x$, allocating logical information representing address information to address bits in the drive logic for memory link addresses for the successive cyclical addressing of the sub-memories according to the criterion of the predetermined sequence of accesses, being allocated such that the sub-memories are successively and cyclically addressed.

5. The method according to claim 4, wherein given two sub-memories and a sequence of four access cycles with a processor bus width of 32 bits, three memory link addresses are formed for a successive cyclical addressing of the sub-memories proceeding on a basis of logical information of the binary address bits of the first memory address having the significance $2^2$ and $2^3$ representing address information, wherein the first memory link address is formed with complementary logical information of the address bit having the significance $2^2$, wherein the second memory link address is formed with complementary logical information of the address bit having the significance $2^3$, and wherein the third memory link address is respectively formed with complementary logical information of the address bits having the significance $2^2$ and $2^3$.

6. The method according to claim 1, wherein a processor-conforming access cycle is implemented within two or three processor clocks, and wherein the processor clocks in the first access cycle of the sequence is matched to the access time to the memory and wherein processor-conforming access cycles are provided for further access cycles of the sequence.

7. The method according to claim 1, wherein the method further comprises checking for coincidence of memory link addresses formed in the microprocessor and of memory link addresses formed in the drive logic, and continuing the sequence of accesses given coincidence of the memory link addresses and ending the sequence of accesses given non-coincidence of the memory link addresses.

8. An arrangement for controlling a predetermined sequence of accesses of a microprocessor via a processor bus to an allocated memory having a plurality of sub-memories formed by individual addressable sub-memories, data being transferred from or to the microprocessor via a data intermediate memory controlled by an access cycle, the access cycle, which is controlled via the processor bus onto the memory, having m processor clocks, a read or write cycle sequencing in the memory having n processor clocks, where n is greater than m, and a sequence of accesses being initiated by at least one first memory address formed by the micro-processor and by status information indicating reading or writing of data from or to the memory, comprising:

drive logic connected between the microprocessor and the sub-memories, said drive logic being structured such that a first memory address, after occurrence of said first memory address, is switched to the addressed sub-memory and a respective memory link address is formed for a further sub-memory according to a criterion of the predetermined sequence and is respectively switched to a further sub-memory, as a result whereof a read or write cycle is initiated in all sub-memories based on a criterion of the status information, and proceeding from the sub-memory addressed by the first memory address, the sub-memories are cyclically and successively driven according to the criterion of the sequence in conformity with the access cycle, whereby, in a drive, based on the criterion of the status information, a read data present at the driven sub-memory is transferred into the intermediate memory and is switched to the microprocessor in conformity with the processor cycle or a data communicated from the micro-processor is stored in the intermediate memory controlled by the processor clock and is also conducted to the addressed sub-memory, and insofar as provided according to the criterion of sequence of accesses, the current memory address is modified, is conducted to the driven sub-memory and, based on the criterion of the status information, an access onto the respective sub-memory is initiated.

9. The arrangement according to claim 8, wherein each sub-memory is a static write/read memory.

10. The arrangement according to claim 9, wherein each sub-memory is formed by at least one static write/read memory circuit.

11. The arrangement according to claim 8, wherein the drive logic is formed by a clock and logic circuit having an intermediate memory that effects transfer of data to be read from the memory or to be written to the memory in conformity with access cycle and processor clock; and wherein the clock and logic circuit has an address intermediate memory and is connected to those address lines of the processor bus whose address information is forwarded unmodified to the sub-memories, the address information being intermediately stored in the processor-clocked address intermediate memory and being switched to the sub-memories via further address lines in conformity with the access cycle, and has an address controller connected to address lines of the processor bus whose address information are forwarded to the addressed sub-memory in the first access cycle and whose link address information is formed in the address controller in the following access cycles of a sequence, is checked and is switched to the appertaining sub-memories, and has an intermediate memory controller that controls the intermediate memory.

12. The arrangement according to claim 8, wherein the microprocessor and the intermediate memory are connected to a drive for dynamic memories; and wherein the drive and the intermediate memory are connected to a dynamic memory for a reading and writing of data, the dynamic memory having higher access times than access times of the static sub-memories.

13. An arrangement for controlling a predetermined sequence of accesses of a microprocessor via a processor bus to an allocated memory having a plurality of sub-memories formed by individual addressable sub-memories, data being transferred under control of an access cycle between the microprocessor and the memory via a data intermediate memory, the access cycle having m processor clocks and a read or write cycle sequencing in the memory having n processor clocks, where n is greater than m, and a sequence of accesses being initiated by at least one first memory address formed by the microprocessor and by status information indicating reading or writing of data from or to the memory, comprising:

drive logic connected between the microprocessor and the sub-memories;

said drive logic having means for switching a first memory address, after the occurrence of said first memory address, to the addressed sub-memory and for forming a respective memory link address for a further sub-memory according to a criterion of the predetermined sequence and is respectively switched to a further sub-memory, as a result whereof a read or write cycle is initiated in all sub-memories based on a criterion of the status information;

said drive logic also having means for cyclically driving, proceeding from the sub-memory addressed by the first memory address, the sub-memories according to the criterion of the sequence in conformity with the access cycle;

wherein based on the criterion of the status information, a read data present at the driven sub-memory is transferred into the intermediate memory and is switched to the microprocessor in conformity with the processor cycle or a data communicated from the microprocessor is stored in the intermediate memory controlled by the processor clock and is also conducted to the addressed sub-memory, and insofar as provided according to the criterion of sequence of accesses, the current memory address is modified, is conducted to the driven sub-memory and, based on the criterion of the status information, an access onto the respective sub-memory is initiated.

14. The arrangement according to claim 13, wherein each sub-memory is a static write/read memory.

15. The arrangement according to claim 14, wherein each sub-memory is formed by at least one static write/read memory circuit.

16. The arrangement according to claim 13, wherein the drive logic is formed by a clock and logic circuit having an intermediate memory that effects transfer of data to be read from the memory or to be written to the memory in conformity with access cycle and processor clock; and wherein the clock and logic circuit has an address intermediate memory and is connected to those address lines of the processor bus whose address information is forwarded unmodified to the sub-memories, the address information being intermediately stored in the processor-clocked address intermediate memory and being switched to the sub-memories via further address lines in conformity with the access cycle, and has an address controller connected to address lines of the processor bus whose address information are forwarded to the addressed sub-memory in the first access cycle and whose link address information is formed in the address controller in the following access cycles of a sequence, is checked and is switched to the appertaining sub-memories, and has an intermediate memory controller that controls the intermediate memory.

17. The arrangement according to claim 13, wherein the microprocessor and the intermediate memory are connected to a drive for dynamic memories; and wherein the drive and the intermediate memory are connected to a dynamic memory for a reading and writing of data, the dynamic memory having higher access times than access times of the static sub-memories.

* * * * *